US012589571B2

(12) United States Patent
Frasnetti et al.

(10) Patent No.: US 12,589,571 B2
(45) Date of Patent: Mar. 31, 2026

(54) METHOD AND DEVICE FOR HEATING AN EMBOSSING ROLLER IN AN EMBOSSING-LAMINATING DEVICE

(71) Applicant: Korber Tissue S.p.A., Lucca (IT)

(72) Inventors: Luca Frasnetti, Montecarlo (IT); Andrea Petrone, Lucca (IT); Graziano Mazzaccherini, Porcari (IT)

(73) Assignee: Valmet Tissue Converting S.p.A., Lucca (IT)

( * ) Notice: Subject to any disclaimer, the term of this patent is extended or adjusted under 35 U.S.C. 154(b) by 620 days.

(21) Appl. No.: 17/917,962

(22) PCT Filed: Mar. 15, 2021

(86) PCT No.: PCT/IB2021/052134
§ 371 (c)(1),
(2) Date: Oct. 10, 2022

(87) PCT Pub. No.: WO2021/205255
PCT Pub. Date: Oct. 14, 2021

(65) Prior Publication Data

US 2023/0129474 A1 Apr. 27, 2023

(30) Foreign Application Priority Data

Apr. 10, 2020 (IT) ........................ 102020000007741

(51) Int. Cl.

| | |
|---|---|
| ***B31F 1/07*** | (2006.01) |
| ***H05B 6/06*** | (2006.01) |
| ***H05B 6/14*** | (2006.01) |
| ***H05B 6/36*** | (2006.01) |

(52) U.S. Cl.
CPC ................. *B31F 1/07* (2013.01); *H05B 6/06* (2013.01); *H05B 6/145* (2013.01); *H05B 6/365* (2013.01); *B31F 2201/0715* (2013.01); *B31F 2201/0771* (2013.01); *B31F 2201/0779* (2013.01); *B31F 2201/0782* (2013.01)

(58) Field of Classification Search
CPC .......... H05B 6/06; H05B 6/145; H05B 6/365; B31F 1/07; B31F 2201/0715; B31F 2201/0771; B31F 2201/0779; B31F 2201/0782
See application file for complete search history.

(56) References Cited

U.S. PATENT DOCUMENTS

| | | | |
|---|---|---|---|
| 3,556,907 A | 1/1971 | Nystrand | |
| 6,746,558 B2 | 6/2004 | Hoeft et al. | |
| 2001/0017084 A1 * | 8/2001 | Honkalampi .......... | D21G 1/006 100/170 |

(Continued)

FOREIGN PATENT DOCUMENTS

| | | |
|---|---|---|
| EP | 1075387 B1 | 11/2003 |
| EP | 1239079 B1 | 6/2007 |

(Continued)

*Primary Examiner* — Abbas Rashid
*Assistant Examiner* — Stephen M Russell
(74) *Attorney, Agent, or Firm* — Breiner & Breiner, L.L.C.

(57) ABSTRACT

An embossing device and a method for embossing, employing an electromagnetic induction device such as to induce an eddy current prevalently on the outer surface of an embossing roller. The eddy currents are such as to prevalently heat the outer surface of the embossing roller.

42 Claims, 6 Drawing Sheets

(56) References Cited

U.S. PATENT DOCUMENTS

| | | | | |
|---|---|---|---|---|
| 2003/0164097 | A1* | 9/2003 | Downing | B29C 31/006 100/38 |
| 2004/0169036 | A1* | 9/2004 | Katakabe | H05B 6/145 399/328 |
| 2007/0137813 | A1* | 6/2007 | Nickel | B31F 1/07 162/158 |
| 2012/0244241 | A1* | 9/2012 | McNeil | B31F 1/07 425/336 |

FOREIGN PATENT DOCUMENTS

| | | | |
|---|---|---|---|
| EP | 1319748 | B9 | 11/2011 |
| EP | 1855876 | B1 | 2/2012 |
| IT | 101995900446040 | | 12/1996 |
| JP | 2007136861 | A | 6/2007 |
| JP | 2019162789 | A | 9/2019 |
| WO | 2018229676 | A1 | 12/2018 |

* cited by examiner

METHOD AND DEVICE FOR HEATING AN EMBOSSING ROLLER IN AN EMBOSSING-LAMINATING DEVICE

TECHNICAL FIELD

The present invention relates to improvements to methods and devices for heating embossing rollers adapted for the production of multi-ply cellulose web materials.

BACKGROUND ART

In the tissue paper production and converting sector, to obtain products such as rolls of toilet paper, kitchen towels, napkins and facial tissues, or the like, it is known to unwind a plurality of cellulose fiber plies from one or more parent reels and convert the plies into a semi-finished or finished product, which comprises two or more plies bonded to one another.

Bonding of the cellulose fiber plies for the production of a multi-ply web material frequently takes place using a glue or through mechanical ply-bonding, i.e., obtained by pressing one ply against the other at high pressure. For this purpose, at least one of the cellulose fiber plies is embossed by means of an embossing roller and a pressure roller, typically coated in an elastically yielding material. Through embossing, the cellulose fiber ply is permanently deformed, forming embossed protrusions. While the cellulose fiber ply is still adhering to the embossing cylinder, glue is applied to the embossing protrusions. Subsequently, a second ply is superimposed on the embossed cellulose fiber ply and the two plies are pressed against each other in the areas that received the glue to cause their mutual adhesion.

Two or more plies, at least one, some or all embossed, are then bonded to form a multi-ply web material. The web material can be wound to form rolls, or cut and folded to form facial tissues, napkins or the like.

In addition to allowing the mutual adhesion of the cellulose material plies, embossing also has the purpose of improving the quality of the multi-ply paper product. For example, it is possible to increase the thickness of each single ply so as to obtain an increase in volume or of the diameter of the finished product, in the case in which the cellulose material ply or plies are wound in rolls. In other cases, it is possible to increase the mechanical strength of the plies, i.e., the ultimate tensile strength, or to increase the absorbency or softness.

For these reasons, many methods and machines for embossing cellulose material plies have been developed, as described in EP1075387, EP1855876, U.S. Pat. No. 3,556,907, EP1239079, EP1319748, U.S. Pat. No. 6,746,558.

To further improve the features of the cellulose material plies an improved embossing technique has been developed, which uses heated embossing rollers. This technique is described in the patent ITMI1995A001197, wherein a ply of cellulose material is moistened and passed through a nip formed by a pair of steel embossing rollers provided with embossing protrusions on the surface, wherein the protrusions of the two rollers are arranged in contact, with pressure, according to a tip-to-tip" pattern, and wherein the two steel rollers are heated to dry the ply during embossing.

To heat the aforesaid embossing rollers (and in general for all calendering systems provided with smooth heated rollers, for example such as in the cases of forming the plies of paper) systems for recirculation of diathermic oil, steam or water positioned inside the embossing roller as used. These systems are very costly, energy-intensive and highly inefficient, as well as dangerous for the operators who require to work in the vicinity of the heating plants and embossing rollers.

Heating of an embossing roller obtained through the recirculation of a fluid also requires long heating times, as the heat supplied internally by the fluid must heat the entire mass of the roller before it reaches the outer surface, i.e., the working surface for treatment of the plies of cellulose material.

Moreover, heating systems with recirculating fluid are dangerous for operators as they are generally pressurized in pipes leading from the heating boilers to the embossing roller. The breakage of, or the leakage of hot fluid from, one of the pipes or simply contact with these pipes can cause severe burns for operators. Therefore, there is the need to improve heating techniques, in particular of the embossing rollers, i.e., to adopt systems that are more energy efficient, that heat the rollers more rapidly and that are safer for the operators who require to work with the embossing machines with heated rollers.

SUMMARY

These and other objects, which will be more apparent below, are achieved with an embossing-laminating device and by means of a method for electromagnetically heating an embossing roller in an embossing-laminating device as described and claimed herein.

Before illustrating the features of the various embodiments of the method, of the device and of the product obtained therewith, some definitions shall be provided.

In the present context the term "embossing" relates to a permanent deformation process of a portion of a cellulose structure, such as a ply or a multi-ply sheet, orthogonally to the plane on which it lies, through which the cellulose structure is permanently deformed with the formation of protrusions or protuberances that project from the normal plane on which the cellulose structure lies, for example the plane on which the ply or the multi-ply web material, if embossing is carried out on a multi-ply material, lies.

An embossing device in general is meant as a device that carries out an embossing process on at least one ply and if necessary bonds two or more plies to each other by lamination, for example using a glue applied to at least one of these plies, preferably to the top surfaces of at least some of the embossing protrusions formed on one or more plies.

"Outer surface" of the embossing cylinder is meant as the whole area comprising the front surfaces of the embossing protrusions, the sides of the embossing protrusions and the surface of the plane on which the roller from which the embossing protrusions project outward lies.

The object of the present invention is to obtain an improved embossing device with heated rollers that solves the problems of the prior art, more in particular, a device with rollers heated by electromagnetic induction for evenly heating the outer surface of the roller.

The object of the invention is also to obtain an embossing device with a heating system of the rollers that is efficient, rapidly reaches the external temperature of the embossing roller and rapidly cools it, so as to reduce the downtimes of the machine and a system with smaller overall dimensions and economical relative to prior art systems. In practice, by heating prevalently the outer surface of the embossing roller, i.e., the working part of the roller that embosses the web material, this prevents energy waste to heat the whole roller. Only the energy required to take the minimum working part of the roller to the required temperature is used and the amount of energy required to maintain the desired temperature is supplied.

The object of the invention is to obtain an embossing device comprising a first path for a first ply of web material along which a first pressure roller, coacting with a first embossing roller, define a first embossing nip for the first ply of web material. The first embossing roller comprises embossing protrusions. The embossing device also comprises at least a first electromagnetic induction device externally associated with the first embossing roller to heat prevalently the outer surface of the first embossing roller, wherein the first electromagnetic induction device is connected to a first generator device to supply said first electromagnetic induction device with electromagnetic induction currents adapted to generate an electromagnetic flux directed toward said first embossing roller and wherein the operating frequency of said electromagnetic induction currents is such as to generate eddy currents on said first embossing roller such as to prevalently follow the profile of the outer surface of said first embossing roller.

The object of the invention is also to produce an embossing device, wherein said eddy currents follow only or prevalently said protrusions of said first embossing roller. Preferably, the operating frequency of the electromagnetic induction current ranges from 500 Hz to 100 kHz, preferably from 1 kHz to 100 kHz, even more preferably from 5 kHz to 100 kHz, more preferably from 10 kHz to 60 KHz. The induction heated embossing device has eddy currents such as to have a minimum value of power density equal to at least 30% of the maximum value of power density, said minimum value being detected within a thickness measured starting from the outer surface of said first embossing roller, equal to at least 0.6 mm, preferably at least 0.4 mm. In other words, at least 70% of the current density is comprised within a thickness equal to at least 0.7 mm, preferably 0.5 mm.

Preferably, the method can include a machine stoppage step comprising the following steps: 1) moving said first pressure roller away from said first embossing roller; 2) maintaining said first induction heated embossing roller rotating at low speed; 3) supplying said induction device with a power such as to maintain the temperature of said embossing roller in a range around a given embossing operating temperature.

In general, a machine stoppage is defined as a condition such that the machine, i must be stopped for safety reasons, for example due to a fault, the breakage of a ply of paper, or for maintenance, but also a condition such that during a stoppage, not caused by safety reasons, the machine must remain ready to start up again. In the case of safety, if the operator requires to operate in the vicinity of the heated embossing roller, it may be necessary to cool this roller. In the case of machine stoppage for matters concerning production, wherein the machine must be ready to start up again quickly, the embossing roller must be kept hot. Similarly, machine stoppage can also be meant as the condition in which the machine is simply switched off, i.e., in non-operational. In this case, the embossing roller must be heated from room temperature to the operating temperature, or close to the operating temperature.

BRIEF DESCRIPTION OF THE DRAWINGS

The invention will be better understood by following the description and the accompanying drawings, which illustrate a non-limiting example of embodiment of the invention. More in particular, in the drawing.

DETAILED DESCRIPTION OF AN EMBODIMENT

Figure 1:
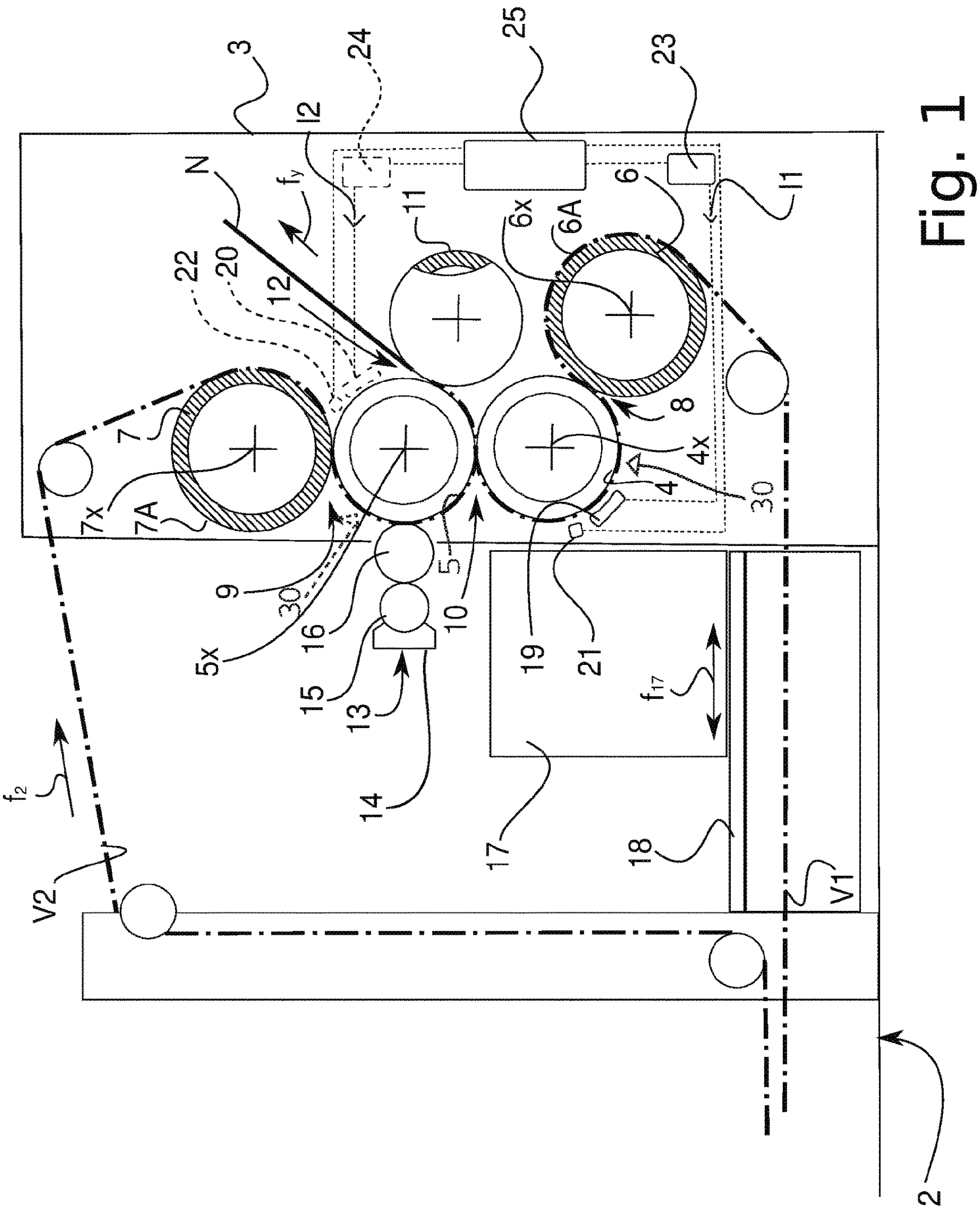
FIG. 1 shows a side view of an embossing-laminating device comprising an electromagnetic induction device.

In the embodiment illustrated, the embossing-laminating device 1 has a load-bearing structure, indicated as a whole with 2. The load-bearing structure can comprise two lateral side panels 3.

In some embodiments, a first embossing roller 4 and a second embossing roller 5 can be arranged between the two lateral side panels 3 of the load-bearing structure 2. The first embossing roller 4 can be provided with embossing protrusions 4P, as shown in the enlarged detail of FIG. 1A, while the second embossing roller 5 can be provided with embossing protrusions 5P, as shown in the enlarged detail of FIG. 1B. The bottom surface of the embossing roller 4, 5 can be defined as the surface of the roller that separates the bases of the embossing protrusions 4P, 5P, and is indicated with 4F and 5F. Generally, the surface 4F, 5F is smooth. In the case of embossing protrusions with two heights, the bottom surface of the embossing cylinder is considered the one that separates the bases of the tips of smaller height.

The first embossing roller 4 can coact with a first pressure roller 6. In some embodiments, the pressure roller 6 can be coated with an outer layer 6A made of a yielding, preferably elastically yielding, material, such as rubber. The second embossing roller 5 can coact with a second pressure roller 7. In some embodiments, also the pressure roller 7 can be coated with an outer layer 7A made of a yielding, in particular elastically yielding, material.

The references 4X, 5X, 6X and 7X indicate the rotation axes of the two embossing rollers 4, 5 and of the two pressure rollers 6, 7, respectively. These axes are substantially parallel to one another.

The first embossing roller 4 and the first pressure roller 6 form therebetween a first embossing nip 8, through which the first ply V1 passes to be embossed by the protrusions 4P of the first embossing roller 4. When the pressure roller 6 is provided with a yielding outer coating 6A, the protrusions 4P are pressed against the first pressure roller 6 and penetrate the yielding coating 6A permanently deforming the ply V1.

The second embossing roller 5 and the second pressure roller 7 form a second embossing nip 9, through which the second ply V2 passes. The second ply V2 is embossed in the similar way to the first ply V1, as a result of the protrusions 5P of the second embossing roller 5 that are pressed against the second embossing roller 7. If provided with an elastically yielding coating 7A, the embossing protrusions 5P penetrate the yielding coating and cause permanent deformation of the ply V2.

The two pressure rollers 6, 7 can be supported by arms or other members that allow a movement thereof toward or away from the respective embossing rollers 4, 5 for the purposes that will be explained below. Actuators (not shown), for example piston-cylinder actuators, can be used to press the pressure roller 6 against the first embossing roller 4 and the second pressure roller 7 against the second embossing roller 5.

In some embodiments, the two embossing rollers 5, 6 can be configured to operate tip-to-tip, i.e., with their protrusions 4P, 5P pressed against one another in a nip 10 formed between the two embossing rollers 4, 5.

In other embodiments, the embossing-laminating device 1 can comprise a laminating roller 11 pressed against the embossing roller 5 and forming therewith a laminating nip 12. In this way, the two plies V1 and V2 can be laminated between the second embossing roller 5 and the laminating roller 11. In the nip 10 the embossing rollers 4, 5 are spaced slightly from one another, so that the two plies V1, V2 are not touching. In this case, the embossing device can generate an embossed material according to the nested technique, with embossing protrusions of the ply V2 nested between embossing protrusions of the ply V1, and vice versa.

In some embodiments, the embossing-laminating device 1 can be configured to operate alternatively according to the tip-to-tip technique or according to the nested technique. For this purpose, the embossing rollers can, for example, move parallel and orthogonally to their axis and the laminating roller can move alternatively into an active position and into a not active position.

Figure 1B:
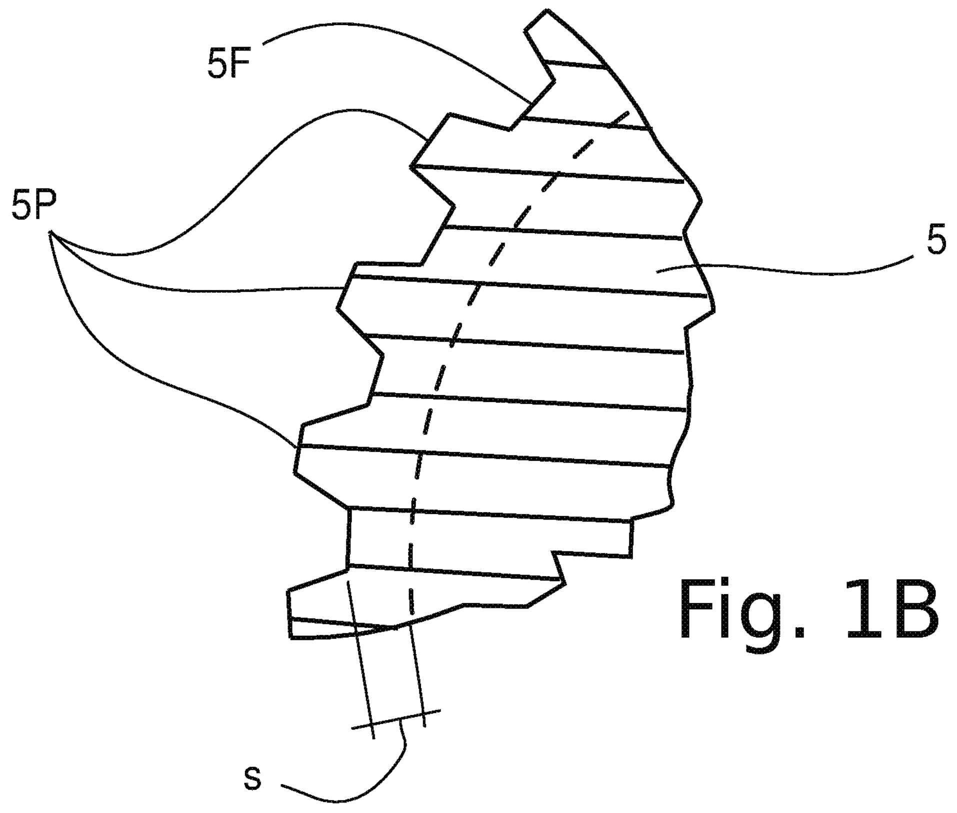
FIGS. 1A and 1B illustrate an enlargement of the detail of FIG. 1.
Figure 1A:
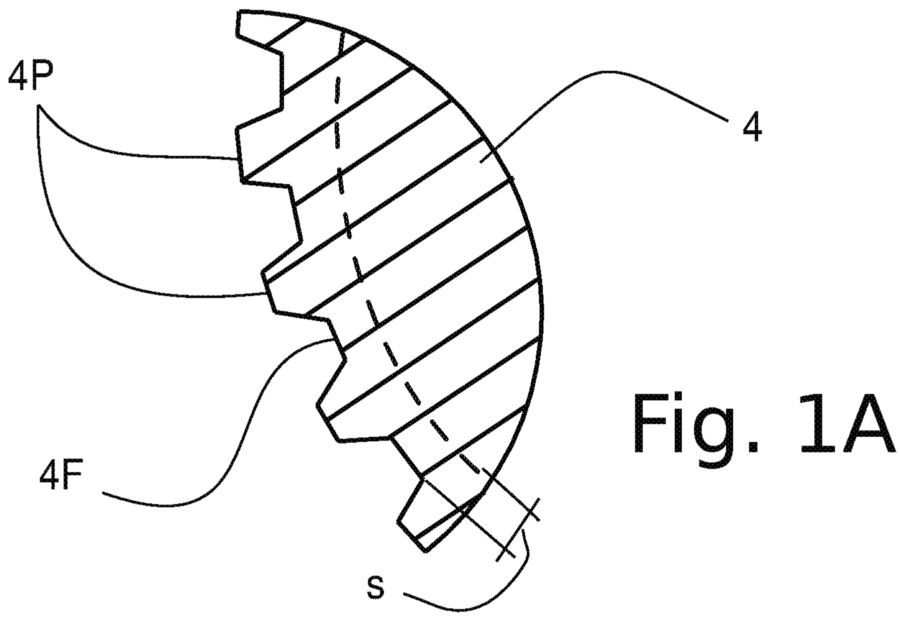

The embossing-laminating device 1 can comprise a functional fluid dispenser 13. The functional fluid dispenser 13 is a device adapted to dispense a fluid, liquid or gaseous, on the ply V2. For example, the functional fluid dispenser 13 can dispense steam, saturated or unsaturated, to promote the adhesion obtained through pressure, of the plies V1 and V2. In preferred embodiments of the invention, as shown in FIG. 1, the functional fluid dispenser 13 can comprise a liquid fluid source 14, a first patterned roller or anilox roller 15, which picks up a liquid from the liquid fluid source 14, and a second cliché or applicator roller 16, which a receives the liquid fluid from the anilox roller 15 and distributes it on portions of the embossed ply V2 adhering to the second embossing roller 5. In general, the liquid fluid is applied at least to some of the tips of the embossing protrusions 5P with which the embossing roller 5 is provided, on the portions of ply embossed by the embossing protrusions 5P. The liquid fluid can be water or glue. In the case in which the fluid is water, adhesion of the plies takes place prevalently through mechanical pressure.

In advantageous embodiments, the first embossing roller 4 and the second embossing roller 5 must be made of ferromagnetic material, metal, for example steel. The metal can be treated with a surface hardening treatment. The embossing protrusions 4P and 5P of the embossing rollers 4 and 5 can be produced in any suitable manner, for example by chemical etching, laser etching, chip removal by means of a tool, or in another suitable manner. The hardening treatment can be carried out only on the embossing protrusions 4P and 5P.

When the embossing-laminating device 1 is in operating condition, the first ply V1 and the second ply V2 move according to the arrows f1 and f2 toward the embossing rollers to be embossed separately between the pairs of rollers 4, 6 and 5, 7. The embossed plies are glued and laminated between the embossing roller 5 and the laminating roller 11 and consequently form a multi-ply web material N that moves according to the double arrow fN toward a station downstream, for example a rewinder, not shown. The pressure roller 7 is pressed against the embossing roller 5, while the pressure roller 6 is pressed against the embossing roller 4 and the laminating roller 11 is pressed against the embossing roller 5 to obtain bonding of the plies V1, V2.

In some embodiments, the functional fluid dispenser unit 13 is mounted on a sliding block or carriage 17 that can move according to the double arrow f17, for example along guides 18 carried by an element of the fixed structure 2. The movement according to the double arrow f17 can be controlled by a suitable actuator, for example a piston-cylinder actuator, by an electric motor, or through any other suitable actuator, not shown.

In advantageous embodiments, an electromagnetic induction device 19, 20 is associated with at least one embossing roller 4, 5 to induce eddy currents on the outer surface of the embossing roller 4, 5 that is heated by Joule effect. In practice, the induced eddy currents circulate locally on the surface of the embossing roller 4,5 and produce heating proportional to the electrical resistance of the embossing roller and to the square of the induced eddy current.

As shown in FIG. 1, the electromagnetic induction device 19 associated with the embossing roller 4 is preferably positioned in an area between the point of contact with the pressure roller 6 and the nip 10 for reasons related to overall dimensions. It is evident that in other embossing-laminating devices that have different configurations, the electromagnetic induction device could be positioned differently, for example between the point of contact with the pressure roller 6 and the nip 10. Similarly, the electromagnetic induction device 20 (marked by a dashed line in FIG. 1) associated with the embossing roller 5 can be positioned alternatively between the point of contact with the pressure roller 7 and the cliché roller 16 or between the point of contact with the pressure roller 7 and the laminating nip 12 or between the cliché roller 16 and the nip 10. The choice of one or more of these positions is a function of the different embossing-laminating devices that exist on the market and which can therefore have different configurations and arrangements of the rollers.

A respective generator or inverter 23, 24 capable of driving the suitable currents toward the induction device in order to obtain the desired heating, is associated with each electromagnetic induction device 19, 20. In a preferred configuration of the invention, to regulate the desired temperature, i.e., the operating temperature, on the surface of the embossing rollers 4, 5 a closed loop control system is produced, composed of at least one temperature sensor 21, 22 of any type, such as thermocouples, pyrometers, thermal cameras or another suitable device, associated with a respective roller, embossing device 4, 5 and connected to the control unit 25, which based on an appropriate control algorithm controls the inverter 23, 24 so as to stabilize the desired temperature on the outer surface of the embossing rollers 4, 5, as will be explained in greater detail below. The control unit can be a PLC, an industrial computer, a microprocessor, a network of computers or any other similar known device.

The generators 23, 24 can be inverters that operate at a specific operating frequency approximately the same as the resonance frequency of the electrical circuit formed by the electromagnetic induction device 19, 20 with the output of this inverter.

Regulation of the operating temperature of the embossing roller with which the induction device is associated can take place as follows. The induction device is regulated to supply the maximum power. This power is maintained until reaching the desired operating temperature (or just below this temperature, for example at least ¾ of this temperature). A PID (proportional-integrative-derivative) controller (associated with the induction device and with the unit 25) is then activated, for the purpose of maintaining the temperature constant, i.e., regulating and compensating the heat absorbed by the paper. By activating the PID controller after reaching the desired target temperature it is possible to obtain faster heating times (compared to the case in which a PID controller is activated from the start of heating). In practice, the PID controller regulates the power of the induction device so that the temperature detected by the sensor minus the "target" temperature (operating temperature) is equal to zero or close to zero. It is understood that other different types of temperature regulation from the aforesaid regulation method are possible, without departing from the objects of the invention.

In preferred embodiments of the invention, during the heating step, i.e., to take the embossing roller 4, 5 from room temperature to the operating temperature, the embossing roller is maintained rotating at low speed. In this step, the embossing roller can be heated both when the ply of paper is wound around it and when it is completely free of the ply of paper. In the first case, the pressure roller is preferably open, i.e., not in contact with the embossing roller, allowing this latter to rotate rubbing on the paper wound around it. In this case, the paper is not fed toward the stations downstream to avoiding discarding a large amount of paper.

Figure 2:
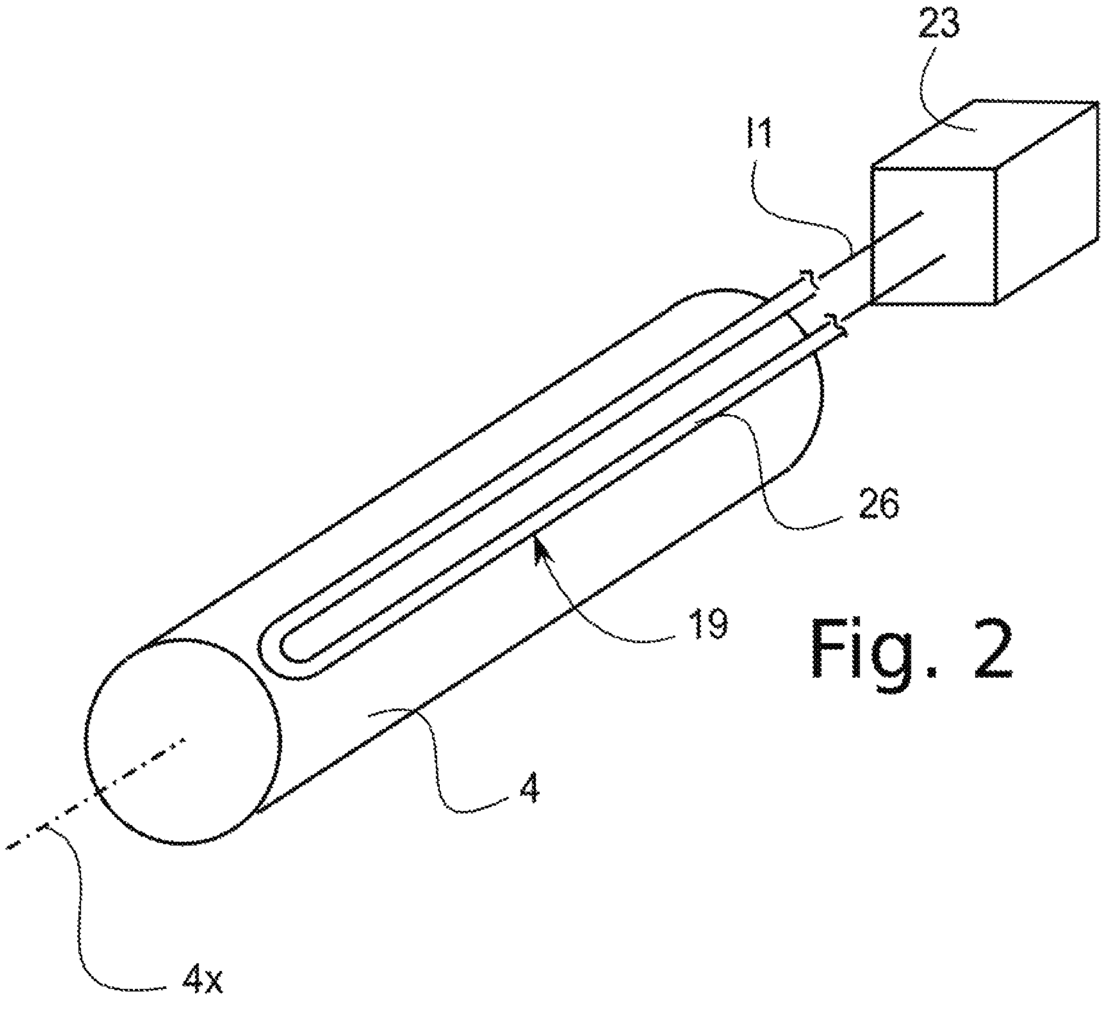
FIG. 2 illustrates an axonometric view of an embossing roller associated with an electromagnetic induction device.
Figure 3:
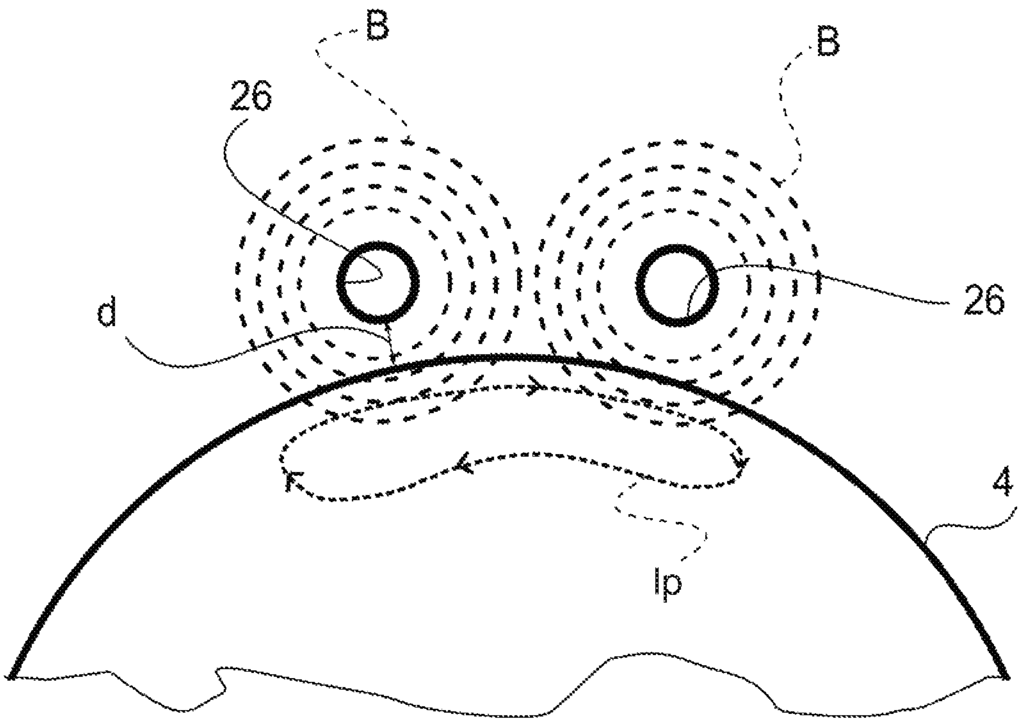
FIG. 3 illustrates a sectional view of FIG. 2 according to a plane orthogonal to the axis of the roller.

As shown schematically in FIG. 2 and FIG. 3, the induction device 19, 20 can comprise a single coil 26 of conductive material such as copper or another suitable material, positioned approximately parallel to the axis 4X, 5X of the embossing roller 4, 5. In other configurations, the induction device 19, 20 can comprise more than one coil.

In one embodiment, the coil 26 of conductive material can be supported by a frame 27 that moves to be able to move the coil 26 toward or away from the outer surface of the embossing roller 4, 5. In a preferred embodiment, the frame 27 swivels according to the arrow f29 around a pivot 29. The swiveling movement of the frame 27 toward or away from the embossing roller can be obtained through an actuator 28 connected to the end 27A of the frame 27. The actuator 28 can be a pneumatic piston controlled by a solenoid valve, not shown, connected to the control unit 25. In this case, by extending or retracting the rod of the piston, the induction device 19 can be moved away from and toward the outer surface of the embossing roller 4, 5, respectively. In other embodiments, the actuator 28 can be an electric motor.

Other alternative embodiments for movement of the frame 27 equivalent to those described above can be produced. For example, the frame 27 can be mounted on a sliding block sliding on a guide to move the frame 27 toward and away from the embossing roller 4, 5 through an actuator, such as pneumatic pistons or electric motors.

The position of the coil 26 is preferably radially symmetrical relative to the embossing roller 4, 5, at least when the coil 26 is in the operating position so as to prevent one of the two conductor branches forming the coil 26 from being closer to the embossing roller 4, 5 than the other. In some cases, the two conductor branches of the coil 26 remain radially symmetrical also in a different position to the operating position.

Figure 4:
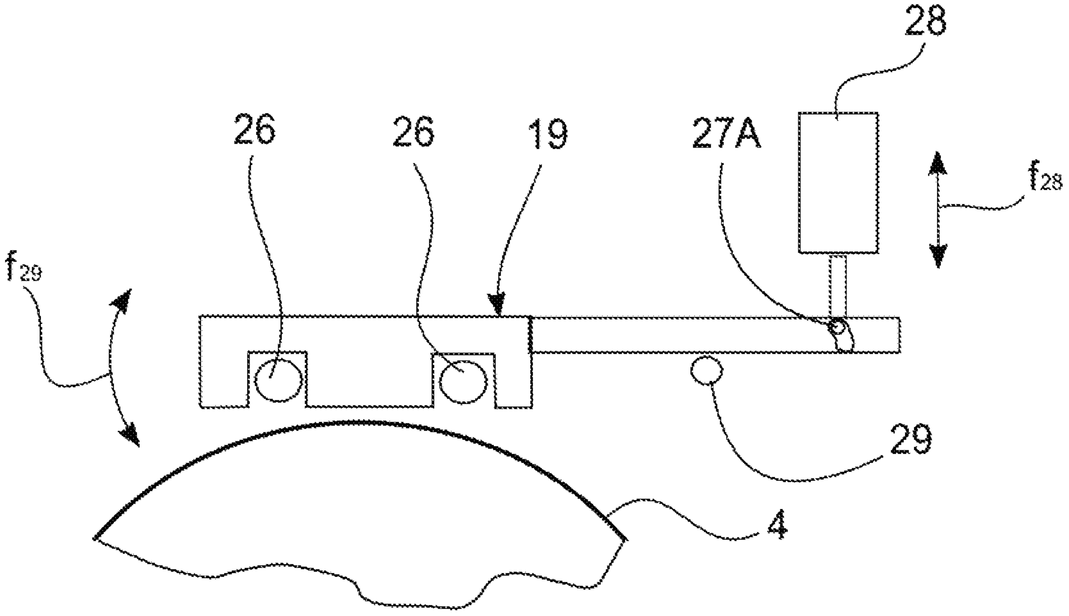
FIG. 4 illustrates a detail of an embodiment of the invention.

In a particularly advantageous embodiment, such as the case of FIG. 4, the frame 27 in the part that supports the coil 26, can be formed by an electromagnetic flux concentrator element 27A, adapted to direct the electromagnetic flux more efficiently toward the outer surface of the roller. Preferably, the electromagnetic flux concentrator 27A is E-shaped, completely surrounding the coil 26, but leaving the side facing the embossing roller 4, 5 free. In this way, leakage of electromagnetic flux is reduced and it is concentrated toward the outer surface of the embossing roller 4, 5 obtaining, with the same heating, smaller supply currents of the induction device. The electromagnetic flux concentrator 27A can be made of ferrite or formed by a pack of non-conductive ferromagnetic laminations, and due to its high magnetic permeability, it obliges the electromagnetic field lines to be directed toward the free side of the coil facing the embossing roller 4, 5. The electromagnetic flux concentrator can also have other shapes, for example rectangular or C-shaped, or other shapes. FIG. 4 shows only a section of the coil 26 and of the electromagnetic flux concentrator 27A that in the preferred embodiment winds around the coil for the whole of its length.

In a preferred variant of the invention, the embossing-laminating device 1 can be provided with one or more sensors, not shown in the figure, to detect breakage of the paper and any accumulation of the plies V1, V2 on the embossing rollers 4, 5. Video cameras, high speed video cameras, viewing video cameras, photocells, arrays of photocells or laser sensors can be used for this purpose. In the case in which the pressure rollers 6, 7 are adjacent to the respective embossing rollers 4, 5, an accumulation signal of the plies V1 or V2 can be generated with air pistons, detecting a pressure peak on the pistons. In other words, accumulation of the plies V1 or V2 around the embossing roller 4, 5 increases the pressure exerted by the pressure roller 6, 7 and the embossing rollers 4, 5. When the sensors for detecting breakage of the paper generate an accumulation signal, toward the control unit 25 to which they are connected, this latter immediately controls a movement of the frame 27 away from the embossing roller 4, 5 to prevent damaging both the embossing rollers and the induction device and puts the machine in emergency mode.

In particularly advantageous embodiments, more than one induction device can be used for each embossing cylinder so as to obtain a surface temperature as even as possible. In this case, the induction devices can be supplied by a same inverter or each by a respective inverter controlled by the central control unit 25 as a function of the temperature of the outer surface of the embossing roller 4, 5 detected by the temperature sensor or sensors.

The induction device 19 can be cooled with known devices. For example, a coolant can be made to flow inside the induction device 19, which in this case can be made with a copper pipe or another conductive material.

In the operating step, the coil 26 of conductive material is supplied with the alternating current I1, I2 and placed in an operating area at a distance d from the outer surface of the embossing roller 4, 5. This creates a magnetic field B that is variable in time that penetrates the outermost part of the embossing roller 4, 5 inducing eddy currents $I_p$ which, as explained previously, heat the embossing roller 4, 5 by Joule effect. The distance d can be variable to regulate the gap and optimize the magnetic flux, and can be between 1 mm and 8 mm.

In some cases, more than one temperature sensor can be used associated with a single embossing cylinder and, even more generally, more than one temperature sensor of different type can be used for each embossing cylinder, for example, one or more thermocouples, pyrometers and/or thermal cameras. Generally, the sensors are positioned externally to the embossing roller 4, 5 but in some cases these sensors can be inserted inside the cylinder. For example, several thermocouples can be positioned inside the embossing roller 4, 5 at different depths to monitor the temperature of the roller along a radial direction, i.e., a direction inside the roller.

The use of a thermal camera can preferred relative to other sensors as it is able to provide a more complete overview of the temperature distribution on the surface of the embossing rollers 4, 5. For example, the embossing protrusions can be at a higher temperature relative to the bottom surface of the embossing rollers, or vice versa, and therefore the frequencies of the electromagnetic induction currents I1, I2 supplied by the inverters 23, 24 to the induction devices 19, 20 must be changed and, in general, suitably controlled. The eddy currents induced on the outer surface of the embossing rollers 4, 5, generated by the magnetic field variable in time, have a penetration depth within the roller that is a function of the magnetization frequency of the induction devices 19, 20.

In fact, as is known, the induced eddy currents are calculated according to the following formula:

$$I_p(x) = I_0 \cdot e^{-\delta/x}$$

where:

$I_p(x)$ is the density modulus of the induced eddy current, function of the penetration depth $I_0$ is the current density modulus for x=0

$$\delta = \frac{1}{\sqrt{\pi \mu_0 \sigma f}}$$

is the penetration thickness where:

f is the frequency of the magnetization currents $\mu_0$ is the relative permeability of the material $\sigma$ is the specific resistance of the material In advantageous embodiments, the temperature profile of the outer surface of the embossing roller 4, 5 can be detected, highlighting any temperature differences between the embossing protrusions 4P, 5P and the bottom surface 4F, 5F and any temperature anomalies between the outer surface of the roller and the innermost part of the embossing roller 4, 5. In this case, the central control unit 25 can control the inverters 23, 24 to modify the frequency and/or the intensity of the electromagnetic induction currents I1, I2 and obtain an optimal temperature profile, i.e., a temperature profile in which only the outer surface of the embossing roller is at the desired temperature. Advantageously the operating frequency can range from 500 Hz to 100 kHz, preferably from 1 kHz to 100 kHz, even more preferably from 5 kHz to 100 kHz, more preferably from 10 kHz to 60 KHz, i.e., frequencies in which the induced eddy currents $I_s$ are mostly confined on the embossing protrusions 4P, 5P.

Figure 5A:
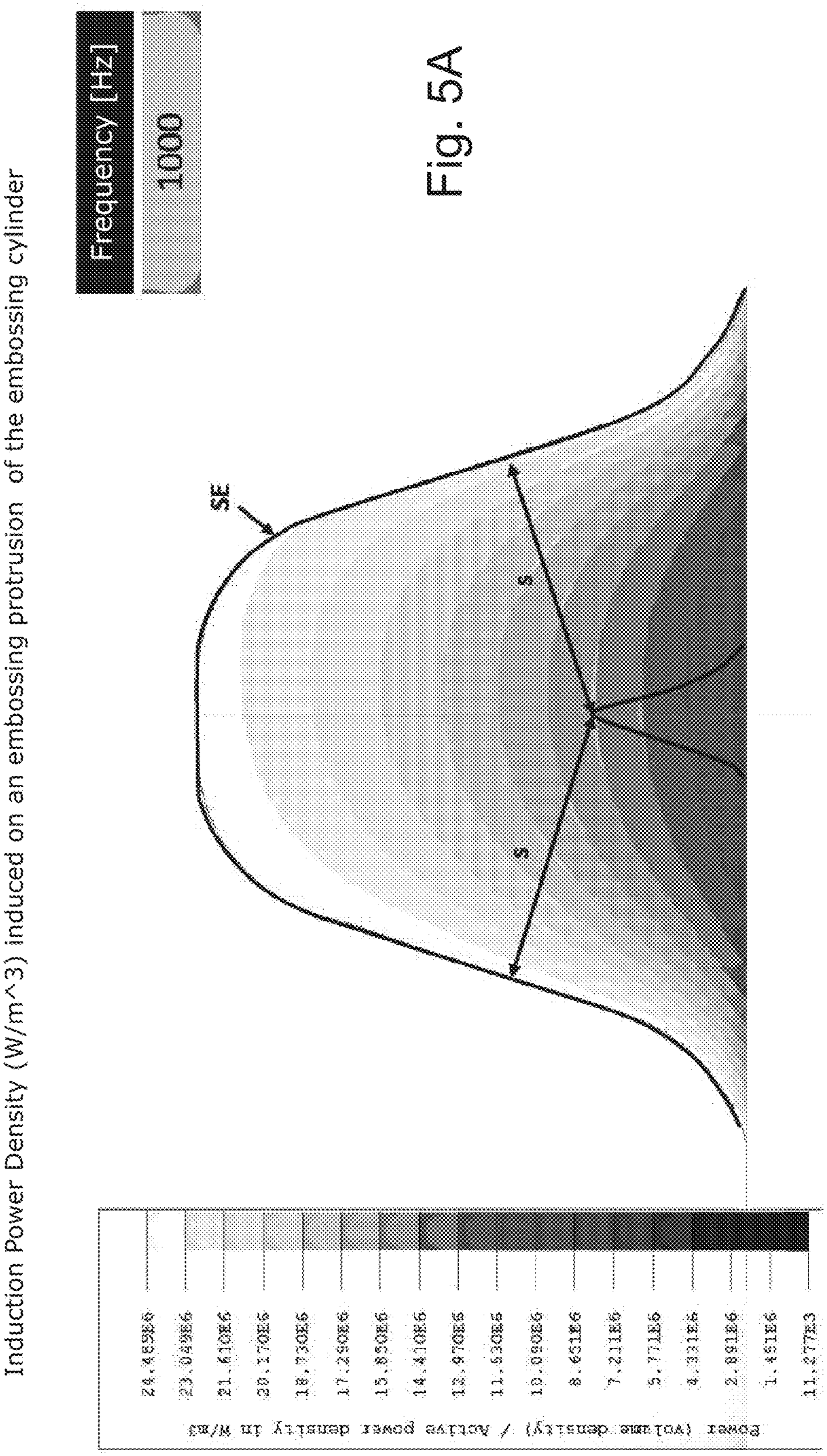
FIG. 5A shows a first simulation of the distribution of power density induced on an embossing protrusion.

As shown in FIG. 5A by supplying the induction device 19 with electromagnetic induction currents I1, I2 at an operating frequency of around 1000 Hz, a distribution of power density that prevalently follows the outer surface SE of one of the embossing protrusions 4P, 5P can be obtained. In other words, a thickness S of the embossing roller 4, 5, measured starting from the outer surface SE, contains a minimum value of power density equal to at least three quarters of the maximum value of power density. The thickness S can vary from one tenth of millimeter up to five tenths of millimeter. In the case of FIG. 5A the thickness is equal to 0.4 mm and contains a minimum power density equal to around three fifths of the maximum value of power density.

Figure 5B:
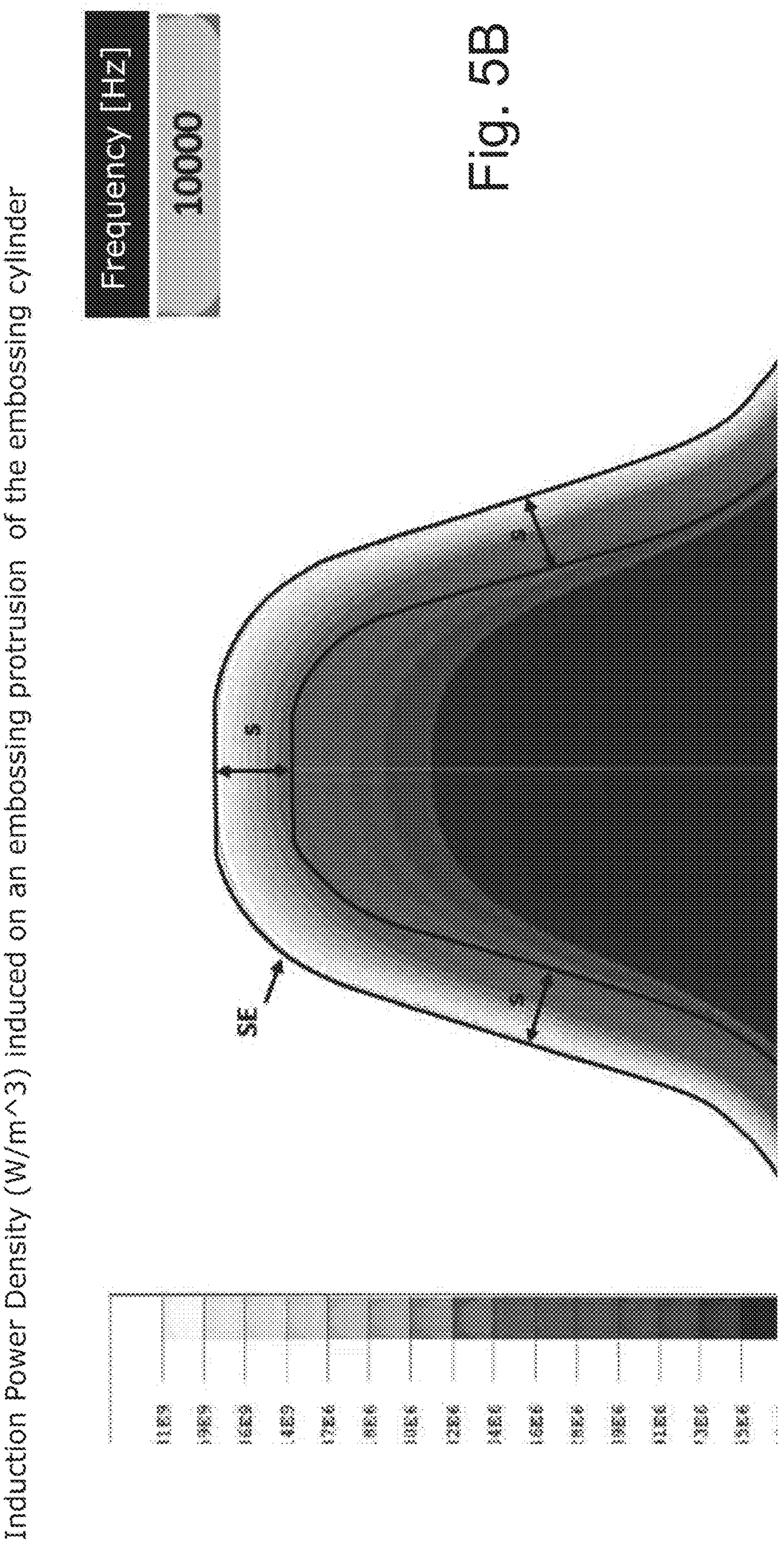
FIG. 5B shows a second simulation of the distribution of power density induced on an embossing protrusion.

FIG. 5B shows an example in which the induction device 19 is supplied with electromagnetic induction currents I1, I2 at an operating frequency of around 10000 Hz. In this case, the eddy currents and consequently the distribution of power density, mostly follow the outer surface SE and consequently its profile. In this case, within the thickness S equal to around 0.1 mm the minimum power density is equal to one third of the maximum value of power density.

In other words, using frequencies, for example, of over 500 Hz, and more preferably over 5 kHz, at least 50% or more of the current density is confined within a thickness of 0.5 mm. By increasing the frequency it is possible to confine 60% or even 70% or more in thicknesses of 0.4 mm or less.

The two illustrated examples concern examples showing how the induced eddy currents $I_s$ must preferably circulate in proximity of the outer surface SE of the embossing rollers 4, 5. In other words, they must be mostly confined in a limited thickness S of the outermost part of the rollers embossing device 4, 5. Advantageously, the distribution of power density is such as to be able to consider the induced eddy currents $I_s$ prevalently on the embossing protrusions 4P, 5P as well as on the bottom surface, i.e., the outer surface of the roller that separates each embossing protrusion 4P, 5P.

In other embodiments, which can also be a function of the embossing pattern, i.e., of the size, shape and distribution of the embossing protrusions 4P, 5P, the embossing-laminating device 1 can be regulated so as to keep the embossing protrusions 4P, 5P at a higher temperature relative to the bottom surface 4F, 5F. Advantageously the control unit 25 controls the inverters 23, 24 to keep only a very small surface thickness S at the desired temperature so as to reduce the energy required for heating and obtain a rapid cooling of the outer surface of the embossing roller 4, 5.

The embossing device can comprise a cooling system 30 (for example indicated in FIG. 1) for the embossing roller 4, 5 with which the induction device 19, 20 is associated. This cooling system 30 is configured to cool the heated embossing roller during machine stoppages, in the case in which the operator requires to work in proximity of the hot embossing roller. Access to the machine is only permitted in safe conditions: the rollers must all be stopped, any brakes must be activated and, in the case of hot roller, this must not exceed a given temperature.

The cooling system 30 can comprise a device for emitting cooling air toward the embossing roller to be cooled, which consists, for example, in a cooling device of the air blade type (i.e., a distributor with a nozzle with elongated slot, which emits an air flow with an elongated, i.e., linear, emission front, preferably at least equal to the axial length of the embossing roller to be cooled), or in a cooling device of vortex tube type, also known with the name "Ranque-Hilsch vortex tube".

Differently, when the embossing device must be stopped for production needs, and therefore not for faults, malfunctioning, maintenance or the like that require the operation of an operator in the vicinity of the embossing rollers, a decrease in the heating of the embossing roller must be prevented, and therefore the induction device is maintained in operation to heat the roller (or the rollers). If it were stopped completely, only the portion thereof facing the induction device would be heated, with evident uneven expansion and unacceptable local overheating. This defect of uneven heating would lead to imbalances and vibrations of the rollers once the embossing device returns to operation, resulting in poor quality embossing on the paper and with risks of malfunctions or lower production rates as the line must be operated at a lower speed until the roller is heated evenly once again. Therefore, during stoppages in which the embossing device is required to start up again shortly, the embossing roller (or both the embossing rollers) must be kept evenly heated at the desired temperature. To do so, the power of the supply currents of the induction device (or the induction devices) must firstly be decreased, as with the line stopped, a heat amount is no longer subtracted through absorption by the paper. Secondly, the embossing roller (or the embossing rollers) must continue to rotate so that the induction device can continue to maintain the roller evenly heated. In order to maintain the embossing roller rotating without the paper breaking the respective pressure roller must be moved away by a suitable amount and, if necessary, the pull of the paper around the pressure and embossing roller must be loosened slightly. In this way, the embossing roller can rotate at a very low speed with the paper continuing to wind around it. The friction between paper and rollers is very low and does not create problems or breakage of the plies. Practically, with this procedure the plies of paper can be made to rub on the outer surface of the rollers embossing without breaking. Naturally, in the case of more than one embossing roller and pressure roller, as in the example shown in the drawings, this logic is applied to all the rollers.

To summarize, with the embossing device stopped: 1) the pressure rollers (both pressing and optionally laminating) are moved away from the embossing rollers, so as to release the paper from the embossing rollers and reduce the tension/pull of the paper, 2) the embossing roller heated by induction is maintained rotating at low speed, 3) the induction device is supplied with a power such as to maintain the temperature approximately constant and equal to the operating temperature, or slightly lower, for example ¾ of the operating temperature, or in any case within a given temperature range around the operating temperature, i.e., the embossing process temperature (settable according to the type of embossing process). For example, given H as the value of the operating temperature, this range is between temperature values equal to $H+\frac{1}{4}\times H$ and $H-\frac{1}{4}\times H$.

Low speed rotation of the embossing roller can be meant as a speed lower than a value equal to one tenth of the operating speed of the roller during the embossing step, and more preferably lower than a value equal to one twentieth of the operating speed, and even more preferably at a tangential speed of the embossing roller ranging from 1 m/min to 10 m/min.

Similarly, when the heated embossing rollers require to be cooled: 1) the pressure rollers (both pressing and optionally laminating) are moved away from the embossing rollers, so as to release the paper from the embossing rollers and reduce the tension/pull of the paper, 2) the embossing roller is maintained rotating at low speed, 3) the induction device is switched off. In this way the low speed rotation of the embossing roller allows the whole of its outer surface to come gradually and repeatedly into contact with the cooling system 30 so as to reduce the cooling times and to obtain even cooling on the whole of the surface of the roller.

Therefore, the embossing device comprises machine-stopping means, which allow the embossing roller and the pressure roller and/or the laminating roller to be moved away from one another and which allow the embossing roller to rotate at low speed. These means are of known type and are not described in detail, and can, for example, comprise relative movement mechanisms or devices of the axes of the embossing roller and of the pressure roller and/or of the laminating device, so that there is no pressure, or limited pressure, between the rollers. A cooling device of the embossing roller can be associated with these means and a program for operating the induction device facing the embossing roller rotating at low speed.

Similarly, when the embossing roller or rollers require to be heated from room temperature to an operating temperature: 1) the embossing roller is rotated at low speed, 2) the induction device is supplied with power. In this step, the ply of paper may or may not be wound around the embossing roller. If the paper is wound around it, the pressure roller is preferably kept open, i.e., not in contact with the embossing roller being heated.

The embodiments described above relate to a type of embossing-laminating device that has been taken as non-limiting example of the invention. In fact, those skilled in the art know that there are many different types of embossing-laminating devices, which can vary in the number of embossing rollers, in their arrangement and, naturally, in the type of treatment they carry out on the plies of paper, without departing from the principles, concepts and teachings of the present invention. For example, the invention can also be applied to an embossing device that comprises only one embossing roller and which therefore does not require a ply-bonding device.

The embodiments described above and illustrated in the drawings have been discussed in detail as examples of embodiment of the invention. Those skilled in the art will understand that many modifications, variants, additions and omissions are possible, without departing from the principles, concepts and teachings of the present invention as defined in the appended claims. Therefore, the scope of the invention must be determined purely on the basis of the broadest interpretation of the appended claims, comprising these modifications, variants, additions and omissions therein. The term "comprise" and derivatives thereof do not exclude the presence of further elements or steps besides those specifically indicated in a given claim. The term "a" or "an" preceding an element, means or characteristic of a claim does not exclude the presence of a plurality of these elements, means or characteristics. When a device claim lists a plurality of "means", some or all of these "means" can be implemented by a single component, member or structure. The stating of given elements, characteristics or means in distinct dependent claims does not exclude the possibility of said elements, characteristics or means being combined with one another. When a method claim lists a sequence of steps, the sequence in which these steps are listed is not binding, and can be modified, if the particular sequence is not indicated as binding. Any reference numbers in the appended claims are provided to facilitate reading of the claims with reference to the description and to the drawing, and do not limit the scope of protection represented by the claims.

The invention claimed is:

1. An embossing device comprising:

a first path, for a first ply of web material;

along the first path, a first pressure roller, coacting with a first embossing roller, the first embossing roller and the first pressure roller defining a first embossing nip for the first ply of web material, the first embossing roller comprising embossing protrusions;

a second path, for a second ply of web material, along the second path, a second pressure roller, coacting with a second embossing roller, the second embossing roller and the second pressure roller defining a second embossing nip for the second ply of web material, at least one coupling device of said first ply and said second ply, coacting with said first embossing roller or said second embossing roller, said coupling device and said first embossing roller or said second embossing roller defining a lamination nip, said coupling device being a roller or a series of coaxial rollers, at least a first electromagnetic induction device externally associated with said first embossing roller to heat a surface of said first embossing roller;

wherein said first electromagnetic induction device is connected to a first generator device to supply said first electromagnetic induction device with electromagnetic induction currents adapted to generate an electromagnetic flux directed toward said first embossing roller and wherein an operating frequency of said electromagnetic induction currents generates eddy currents on said first embossing roller such as to prevalently follow a profile of an outer surface of said first embossing roller; and wherein the embossing device comprises said first electromagnetic induction device and a movement device for moving the electromagnetic induction device from an operating area close to and alongside said first embossing roller to a non-operating area at a distance from said first embossing roller.

2. The embossing device according to claim 1, wherein said eddy currents only or prevalently follow said protrusions of said first embossing roller.

3. The embossing device according to claim 1, wherein said operating frequency of said electromagnetic induction current ranges from 500 Hz to 100 KHz.

4. The device according to claim 1, wherein said eddy currents alternately have:

a minimum value of power density equal to at least 30% of a maximum value of power density, said minimum value being detected within a thickness measured starting from the outer surface of said first embossing roller, equal to at least 0.6 mm;

at least 60% current density within a thickness measured starting from the outer surface of said first embossing roller, equal to at least 0.6 mm.

5. The embossing device according to claim 1, wherein the electromagnetic induction device comprises an electromagnetic flux concentrator.

6. The embossing device according to claim 1, further comprising:

at least a first temperature sensor adapted to detect temperature of said first embossing roller with which said at least a first electromagnetic induction device is associated;

a central control unit connected in communication with said first temperature sensor.

7. The embossing device according to claim 6, wherein said first generator device is controlled by the central control unit as a function of the temperature detected by said first temperature sensor varying said operating frequency and/or intensity of said electromagnetic induction currents.

8. The embossing device according to claim 1, wherein said first electromagnetic induction device and a second electromagnetic induction device are associated with the first embossing roller and/or with the second embossing roller, respectively.

9. The embossing device according to claim 1, wherein a first temperature sensor and a second temperature sensor are associated with the first embossing roller and with the second embossing roller, adapted to detect the temperature of said first embossing roller and said second embossing roller with which said first electromagnetic induction device and said second electromagnetic induction device are associated.

10. The embossing device according to claim 1, wherein said first temperature sensor and said second temperature sensor are connected in communication with a central control unit.

11. The embossing device according to claim 9, wherein the temperature detected by said first temperature sensor and/or said second temperature sensor is the temperature of the outer surface of said first embossing roller and/or said second embossing roller.

12. The embossing device according to claim 1, further comprising a functional fluid dispenser coacting with said first embossing roller to dispense fluid on at least some protrusions of said first embossing roller over which said first ply travels.

13. The embossing device according to claim 12, wherein said fluid is glue, water, steam or a combination thereof.

14. The embossing device according to claim 1, wherein said at least a first electromagnetic induction device is positioned between said first embossing nip and said lamination nip.

15. The embossing device according to claim 12, wherein said first electromagnetic induction device is positioned between said first embossing nip and said functional fluid dispenser.

16. The embossing device according to claim 12, wherein said first electromagnetic induction device is positioned between said functional fluid dispenser and said lamination nip.

17. The embossing device according to claim 1, wherein said operating area is equal to a distance ranging from 1 mm to 10 mm.

18. The embossing device according to claim 1, wherein said first electromagnetic induction device is longitudinally adjacent to said first embossing roller and has a length equal to an axial length of said first embossing roller and/or said second embossing roller.

19. The embossing device according to claim 1, comprising at least one sensor to detect breakage of said first ply or said second ply of web material, connected in communication with a central control unit.

20. The embossing device according to claim 1, wherein a central control unit controls opening of the first electromagnetic induction device from the operating area to the non-operating area in a case in which a sensor detects breakage of said first ply or said second ply of web material.

21. The embossing device according to claim 1, further comprising a system for cooling said first embossing roller and/or said second embossing roller with which at least one heating system is associated, adapted to be operated to cool said first embossing roller and/or said second embossing roller during machine stoppages.

22. The embossing device according to claim 21, wherein said system for cooling comprises at least one device for emitting cooling air toward said first embossing roller and/or said second embossing roller to be cooled.

23. The embossing device according to claim 22, wherein said device for emitting cooling air is of an air blade type.

24. The embossing device according to claim 22, wherein said device for emitting cooling air is of a vortex tube type.

25. The embossing device according to claim 1, further comprising machine-stopping means configured to move said pressure roller and/or said coupling device away from the embossing roller, simultaneously maintaining the embossing roller rotating at low speed.

26. The embossing device according to claim 25, wherein said machine-stopping means in a case in which said embossing roller requires to remain heated, maintains said electomagnetic induction device facing said embossing roller operating during rotation at the low speed, with an induction power to maintain the temperature of said embossing roller in a range around a given embossing operating temperature, in a case in which said embossing roller requires to be cooled, cool the embossing roller by a cooling system, adapted to act at least during rotation of the embossing roller at the low speed.

27. The embossing device according to claim 25, wherein said machine-stopping means, in a case in which an initial heating step of a said embossing roller from a temperature condition below the operating temperature to an operating temperature condition is required:

maintain said embossing roller rotating at the low speed with said pressure roller and/or said coupling device moved away from the embossing roller, operate the electromagnetic induction device facing said embossing roller during rotation at the low speed to heat said embossing roller from a temperature condition below the operating temperature to an operating temperature condition.

28. A method for electromagnetically heating an embossing roller in an embossing device, comprising steps as follows:

providing a first path, for a first ply of web material wherein a first pressure roller, coacting with a first embossing roller, defines a first embossing nip for the first ply of web material, the first embossing roller comprising embossing protrusions;

providing an electromagnetic induction device to generate an electromagnetic flux variable in time directed toward an outer surface of said embossing roller, inducing on said first embossing roller eddy currents that generate heat by the Joule effect;

an electromagnetic induction current generator;

wherein generating said electromagnetic flux at an operating frequency such as to generate, on said first embossing roller, eddy currents that prevalently follow a profile of an outer surface of said first embossing roller; and wherein said electromagnetic induction device is movable from a first operating area alongside said first embossing roller to a non-operating area distanced from said first embossing roller.

29. The method according to claim 28, wherein said eddy currents only or prevalently follow the profile of said protrusions of said first embossing roller.

30. The method according claim 28, wherein the operating frequency of said electromagnetic induction current ranges from 500 Hz to 100 KHz.

31. The method according to claim 28, wherein said eddy currents are such as to alternatively measure:

at least 30% of maximum value of power density within a thickness of 0.6 mm;

at least 60% of current density within a thickness measured starting from the outer surface of said first embossing roller, equal to at least 0.6 mm.

32. The method according to claim 28, wherein the electromagnetic induction device comprises an electromagnetic flux concentrator.

33. The method according to claim 28, further comprising at least one temperature sensor to detect external temperature of said first embossing roller connected in communication with a central control unit.

34. The method according to claim 28, wherein said electromagnetic flux is governed as a function of the temperature of the outer surface of said embossing roller detected by a temperature sensor.

35. The method according to claim 33, wherein the central control unit controls said electromagnetic induction current generator to vary the frequency and/or intensity of said electromagnetic induction current, said electromagnetic induction current is supplied by said generator toward said electromagnetic induction device.

36. The method according to claim 33, wherein the central control unit controls movement of said electromagnetic induction device from the first operating area, alongside said first embossing roller, toward the non-operating area, distanced from said first embossing roller, when at least a first sensor adapted to detect breakage of said first ply of web material notifies said first central control unit of the breakage of said first ply.

37. The method according to claim 36, wherein said at least one temperature sensor is a photocell or an array of photocells or a laser sensor or a video camera or a high speed video camera, or a vision system.

38. The method according to claim 33, wherein said at least one temperature sensor detects the temperature of said protrusions of said first embossing roller and the temperature of a bottom surface of said first embossing roller, and wherein said central control unit governs said electromagnetic induction current generator as a function of the difference of said temperatures of said protrusions and of said bottom surface.

39. The method according claim 28, further comprises a machine-stopping step comprising steps as follows:

moving said first pressure roller away from said first embossing roller, maintaining said first embossing roller which is induction heated rotating at low speed.

40. The method according to claim 39, alternatively comprising steps of:

supplying said electromagnetic induction device with a power such as to maintain the temperature of said embossing roller in a range around a predetermined embossing operating temperature, switching off said electromagnetic induction device and cooling said first embossing roller by a cooling system.

41. The method according to claim 40, wherein said cooling system comprises at least one device for emitting cooling air toward said at least one embossing roller to be cooled.

42. The method according to claim 28, further comprising an initial heating step of a said first embossing roller from a temperature condition below the operating temperature to an operating temperature condition, comprising steps of:

maintaining said first embossing roller rotating at a low speed, supplying said electromagnetic induction device to heat said first embossing roller.

* * * * *